(12) United States Patent
Saruwatari et al.

(10) Patent No.: US 6,877,113 B2
(45) Date of Patent: Apr. 5, 2005

(54) BREAK DETERMINING CIRCUIT FOR A DEBUGGING SUPPORT UNIT IN A SEMICONDUCTOR INTEGRATED CIRCUIT

(75) Inventors: Toshiaki Saruwatari, Kawasaki (JP); Koutarou Tagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 10/101,777

(22) Filed: Mar. 21, 2002

(65) Prior Publication Data

US 2002/0146876 A1 Oct. 10, 2002

(30) Foreign Application Priority Data

Apr. 6, 2001 (JP) ........................................ 2001-108954

(51) Int. Cl.[7] .............................................. G06F 11/00
(52) U.S. Cl. ............................. 714/34; 714/35; 714/45; 717/128; 717/129
(58) Field of Search .......................... 714/34, 35, 32, 714/39, 45, 38; 712/227, 244; 717/124, 126, 128, 129

(56) References Cited

U.S. PATENT DOCUMENTS

| | | | | | |
|---|---|---|---|---|---|
| 3,688,263 | A | * | 8/1972 | Balogh et al. | 712/227 |
| 5,488,688 | A | * | 1/1996 | Gonzales et al. | 714/34 |
| 5,491,793 | A | * | 2/1996 | Somasundaram et al. | 714/45 |
| 5,809,293 | A | * | 9/1998 | Bridges et al. | 712/227 |
| 5,978,902 | A | * | 11/1999 | Mann | 712/227 |

FOREIGN PATENT DOCUMENTS

JP  2-14332  1/1990

* cited by examiner

*Primary Examiner*—Robert Beausoliel
*Assistant Examiner*—Aaron D Matthew
(74) *Attorney, Agent, or Firm*—Staas & Halsey LLP (57) ABSTRACT

A semiconductor integrated circuit including a debugging support unit and a buffer memory for temporarily storing trace data, the debugging support unit comprising a break detection member that detects a break signal externally inputted and a break determining member that determines whether the break signal requests to shift to break processing after outputting all the trace data stored in the buffer memory or the break signal requests to shift to the break processing with immediately suspending trace data outputting.

4 Claims, 9 Drawing Sheets

BREAK DETERMINING CIRCUIT FOR A DEBUGGING SUPPORT UNIT IN A SEMICONDUCTOR INTEGRATED CIRCUIT

BACKGROUND OF THE INVENTION

1. Field of the Invention

The present invention generally relates to semiconductor integrated circuits and more particularly, to a semiconductor integrated circuit having a CPU and peripheral circuits (resources) built therein and also having a debugging support unit.

2. Description of the Related Art

Figure 1:
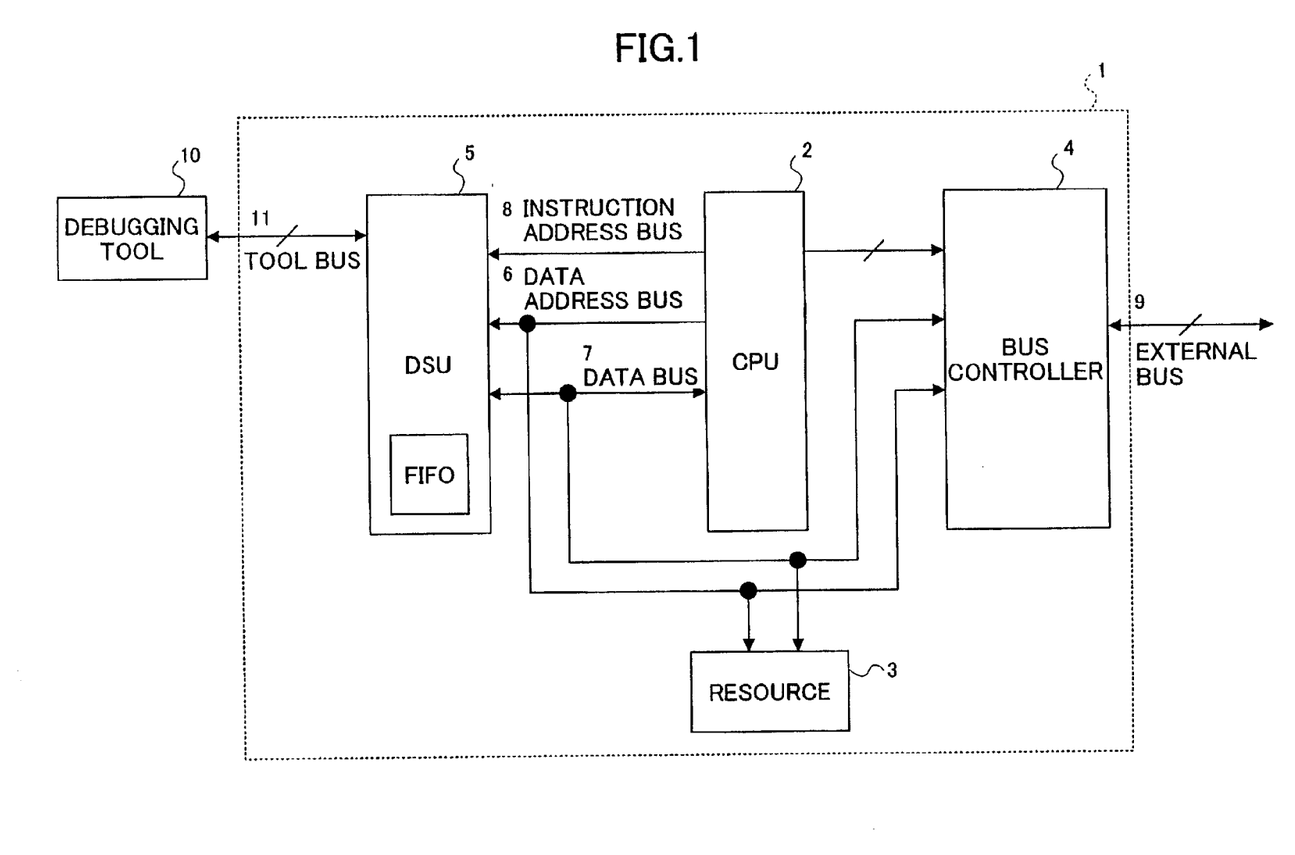
FIG. 1 is a block circuit diagram showing major parts of a semiconductor integrated circuit 1 (chip) in the prior art.

FIG. 1 is a block circuit diagram showing major parts of a semiconductor integrated circuit 1 (chip) in the prior art. The semiconductor integrated circuit 1 includes a CPU (Central Processing Unit) 2 which executes instructions, a resource 3 such as a RAM (Random Access Memory) and a timer and so forth, and a bus controller 4. The semiconductor integrated circuit 1 further includes a debugging support unit (DSU) 5, an address bus 6 and a data bus 7. The CPU 2 outputs instruction addresses to the debugging support unit 5, which outputs the instruction addresses to a debugging tool 10. The semiconductor integrated circuit 1 further includes a control signal line or instruction address bus 8, through which read/write signals, wait signals and so forth are supplied from the CPU 2 to the debug tool 10 via the DSU 5. The bus controller communicates with external devices (not shown) through an external bus 9. This chip (semiconductor integrated circuit) 1 is connected with the debugging tool 10, which monitors all the operation performed by the CPU 2 and can stop the operation of the CPU 2 when a running program branches out to an address which does not exists.

Recently, the operation frequency inside the CPU has been greatly increased, and the operation frequency on a tool bus 11 comes to be unable to catch up with the CPU operation. Further, as it becomes difficult to adjust skew between bits when the operation becomes of a higher rate, it becomes difficult to prepare a bit width same as the bit width of the internal bus of the CPU 2.

In order to compensate the difference in ability between the CPU bus and tool bus 11, trace data has been once stored in a buffer memory (FIFO), adjusted so as to match with the frequency and bit width of the tool bus 11 and then outputted onto the tool bus 11 in the prior art. Thereby, the trace data is outputted to the tool bus 11 with a delay from the real timing at which the CPU executes instructions. Furthermore, in the prior art, after the CPU detects a break request from the debugging tool 10, the CPU outputs all the data stored in the buffer memory (FIFO), and then break processing is at last started.

Thereby, a useless time duration occurs, from the time the break request is detected until the break processing is actually started, in which neither a user program for performing the actual operation of the system nor an emulator program performing debugging of the system is executed. Accordingly, especially in such a system as that of mechanical controlling in which real-time operation of program is important, breaking processing such as re-writing memory contents while emulating the actual operation cannot be performed.

Therefore, in a case of such breaking processing as that for which a debugging person does not have to examine trace data, it is necessary to shorten the time duration from the CPU break until the emulator program processing is started so that the suspended period during which the execution of the user program is stopped by the break processing should be limited so as not to adversely affect the real-time execution.

SUMMARY OF THE INVENTION

For this purpose, according to the present invention, the following functions are provided:

(I) Processing (A) with referring to trace data and processing (B) without referring to trace data are distinguished from each other. In a case of (A), break processing is performed in the same manner as in the prior art. On the other hand, in a case of (B), outputting the trace data to the tool bus 11 is stopped immediately after the detection of a break request, and the CPU 2 performs break processing at once. Thereby, it becomes possible to remarkably reduce the suspended time during which execution of user program is stopped for break processing. This is advantageous especially for a case where the debug tool does not have to obtain all the trace data before the break, for example a case where a part of the memory 3 is re-written during debugging of a system which needs real-time operation.

(II) Identification as to whether (A) or (B) is made by monitoring waveform of a break signal. Thereby, the identification can be easily made without adding a dedicated signal line.

(III) Upon completion of the break processing, trace data remaining in the buffer memory (FIFO) is outputted from the point at which interruption occurred due to the break. Thereby, the continuity of the trace data can be ensured.

DETAIL DESCRIPTION OF THE PREFERRED EMBODIMENTS

A description will now be given, with reference to the drawings, of embodiments of the present invention.

In the drawings, the same parts shown in different figures are given the same reference numerals, and explanation thereof will be omitted.

Figure 2:
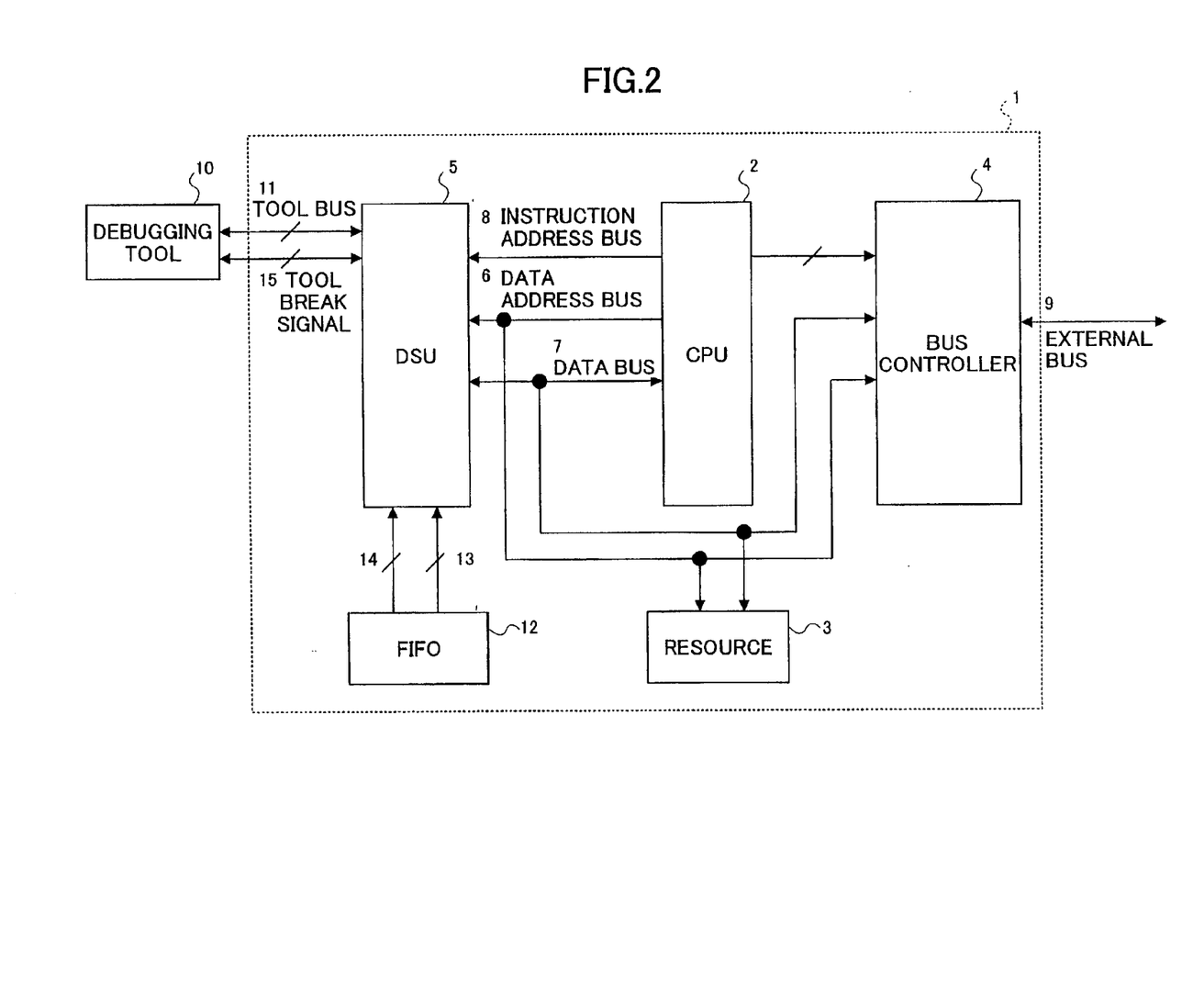
FIG. 2 shows a block diagram of a semiconductor integrated circuit (a microcomputer chip or a chip) 1 according to one embodiment of the present invention.

FIG. 2 shows a block diagram of a semiconductor integrated circuit (a microcomputer chip or a chip) 1 according to one embodiment of the present invention.

The microcomputer chip 1 includes a CPU 2, a peripheral resource 3 connected to a CPU bus, a bus controller 4, and a debugging support unit (DSU) 5 which functions as an interface circuit between the CPU 2 and a debugging tool (ICE) 10.

The microcomputer chip 1 uses an instruction address bus 8 for instruction fetch, and uses a data address buss 6 and a data bus 7 for data access. The microcomputer chip further includes an external bus 9 and a tracing tool bus 11 through which the instruction execution status of the CPU 2 is outputted to the ICE 10. The tool bus 11 comprises a trace data four-bit bus and a bus status three-bit bus. A FIFO 12 functions as a buffer memory for temporarily storing the trace data.

A bus 13 is used for writing the trace data from the DSU 5 into the FIFO 12 and a bus 14 is used for reading out the trace data from the FIFO 12 to the DSU 5. A tool break signal line 15 is used for transmitting a break instruction from the ICE 10 to the DSU 5 when performing on-the-fly debugging such as rewriting status parameters within the CPU 2 after stopping the execution of a user program.

The operation of this semiconductor integrated circuit shown in FIG. 2 will be explained below. In a case of debugging a user program in the microcomputer chip 1, usually the CPU 2 is stopped at a predetermined break point, and trace data outputted from the DSU 5 to ICE 10 is monitored to debug. But in some cases, it is necessary to rewrite the contents of registers or memories within the CPU 2 in real time, without monitoring the trace data (this situation is referred to as "on-the-fly debugging" hereinafter). In this case, a tool break signal 15 is asynchronously sent from the ICE 10 external to the chip 1. This is referred to as "pseudo on-the-fly break", because the on-the-fly debugging can be performed in a pseudo manner.

In the present embodiment, this tool break signal 15 is detected and it is determined whether the detected signal is a normal break signal or a pseudo on-the-fly break signal. If the detected signal is a pseudo on-the-fly break signal, the output of the trace data from the FIFO is immediately stopped. If the detected signal is a normal break signal, all the trace data within the FIFO are outputted. Then, the trace mode is suspended, and the CPU 2 enters emulation mode and performs necessary processing according to a debugging program.

Comparing with the case of a normal break signal, the CPU 2 can enter the emulation mode earlier in the case of a pseudo on-the-fly break, by an amount of time required for outputting the trace data within the FIFO. In this case, the CPU 2 returns to the trace mode after debug processing. At this time, the continuity of the trace data is ensured because trace data outputting is resumed from the trace data remaining in the FIFO.

Figure 3:
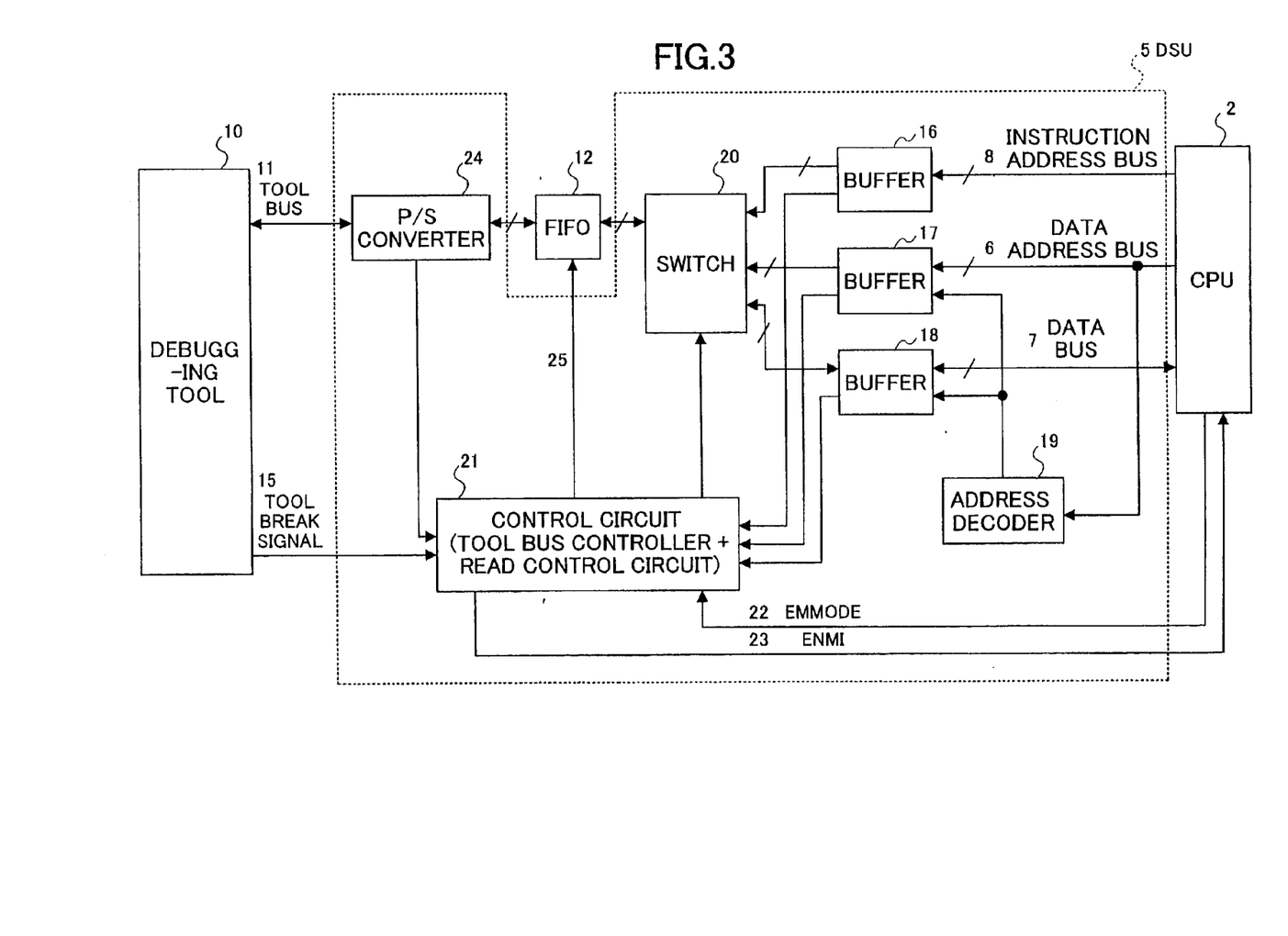
FIG. 3 shows a block diagram of the DSU 5 according to the embodiment of the present invention.

FIG. 3 shows a block diagram of the DSU 5 according to the embodiment of the present invention. In FIG. 3, parts that are the same as the parts shown in FIG. 2 are given the same reference numerals, and explanation thereof will be omitted. The DSU 5 includes three buffers 16, 17, 18. The buffer 16 holds an instruction address supplied from the instruction address bus 8. The buffer 17 holds a data address supplied from the data address bus 6. The buffer 18 holds data supplied from the data bus 7.

The DSU 5 further includes an address decoder 19 for detecting a data write for a specific address, a switch 20 for selecting data from buffers 16, 17, 18 to output the selected data to the trace tool bus 11, and a control circuit 21 that determines a next data to be outputted and controls the switch 20 based on the status of buffers 16, 17, 18 and a parallel/serial converter 24. The control circuit 21 detects and identifies the tool break signal 15 and instructs the FIFO 12 to output trace data. By using an EMMODE signal 22, the CPU 2 notifies the DSU 5 of either one of an emulator mode or a user mode. The DSU 5 transmits a tool break signal (ENMI) 23 to the CPU 2.

The parallel/serial converter 24 serially outputs data stored in the FIFO 12 to a trace tool bus 11. The control circuit 21 detects and identifies a tool break signal and transmits a signal 25 that indicates either one of immediately suspending the trace data output or outputting all the trace data in the FIFO.

Figure 4:
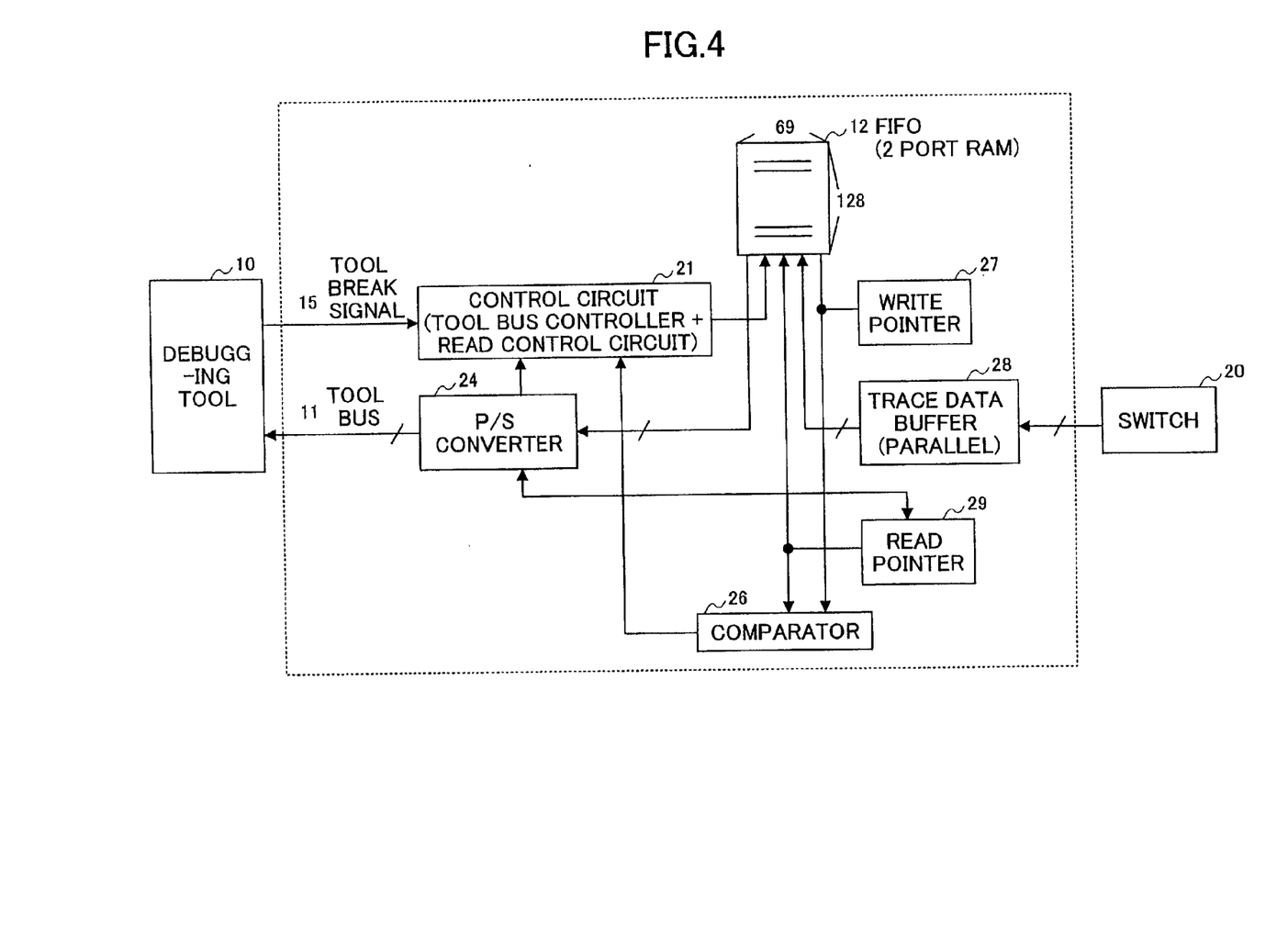
FIG. 4 shows a block diagram of the FIFO and its peripheral circuits according to the embodiment of the present invention.

FIG. 4 shows a block diagram of the FIFO and its peripheral circuits according to the embodiment of the present invention.

In FIG. 4, parts that are the same as the parts shown in preceding figures are given the same reference numerals, and explanation thereof will be omitted. The FIFO includes a comparator 26, a write pointer 27, a trace data buffer (parallel) 28 and a read pointer 29. A FIFO 12 is shown as a two port RAM having 69 bits×128 words structure. That is, the bus width for writing into and reading from this FIFO is a 69-bit width. Because the FIFO is a two-port type, it has two sets of input/output terminals for address and data and can process two requests for reading and writing simultaneously.

Figure 5:
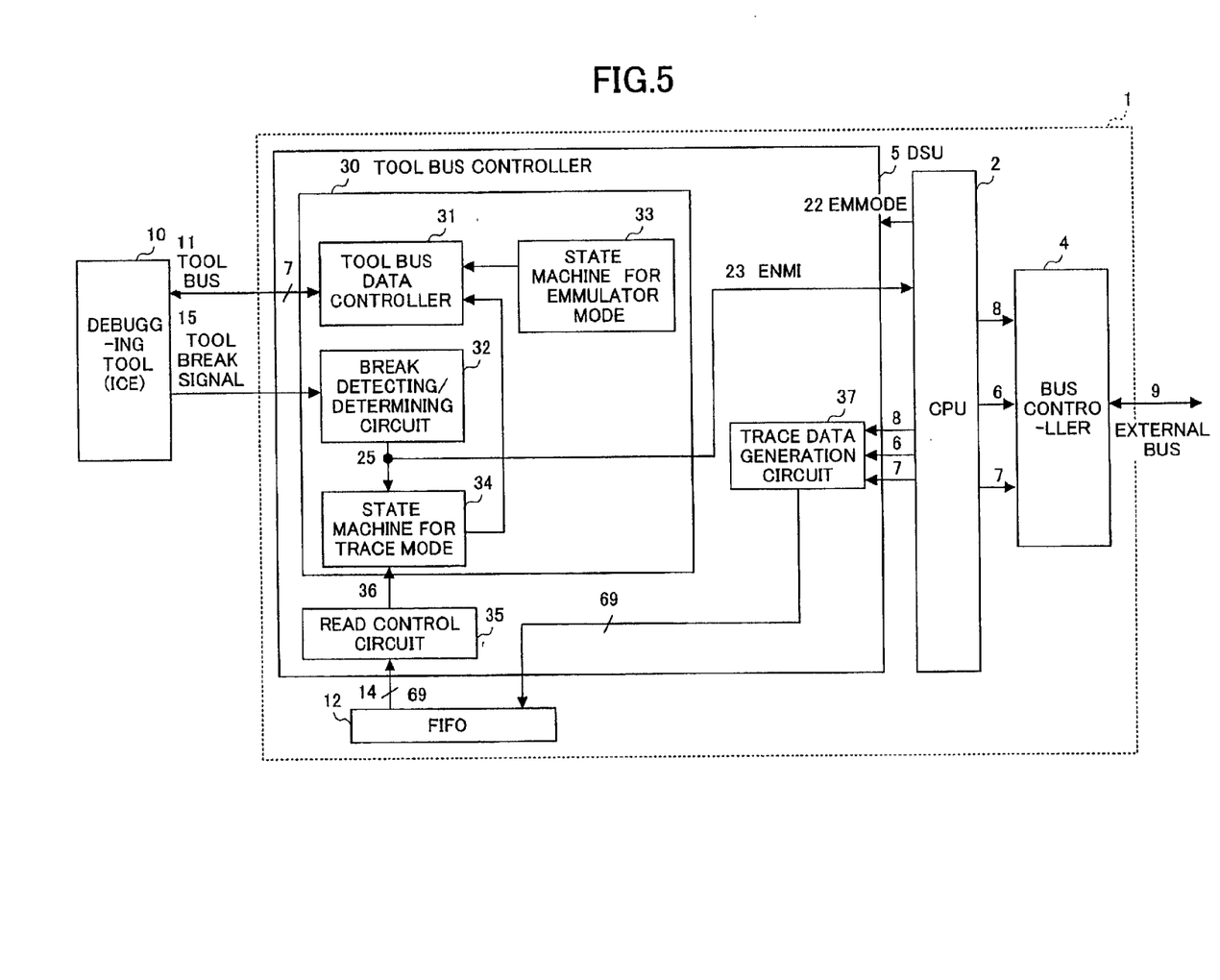
FIG. 5 is a block diagram showing control functions within a DSU 5.

FIG. 5 is a block diagram showing control functions within a DSU 5.

Also in FIG. 5, parts that are the same as the parts shown in preceding figures are given the same reference numerals, and explanation thereof will be omitted. The DSU 5 includes a tool bus controller 30, a tool bus data controller 31. The tool bus data controller 31 controls a direction of the tool bus and performs serial/parallel and parallel/serial conversions according to the instruction by each state machine.

The DSU 5 further includes a break detecting/determining circuit 32, a state machine 33 for emulator mode and a state machine 34 for trace mode. The controlling functions of the state machine 34 for trace mode will be explained later in detail. Further provided is a read control circuit 35 that has a buffer with a capacity corresponding to one trace data, and automatically stores a trace data when it exists in the FIFO 12.

By using a signal 36, the read control circuit 35 notifies the state machine 34 for trace mode that the read control circuit 35 has stored a trace data from the FIFO 12 and is ready for outputting the trace data. A trace data generation circuit 37 includes blocks 16, 17, 18, 19, 20 and 21, which are not shown in FIG. 5 but shown in FIG. 3.

Figure 6:
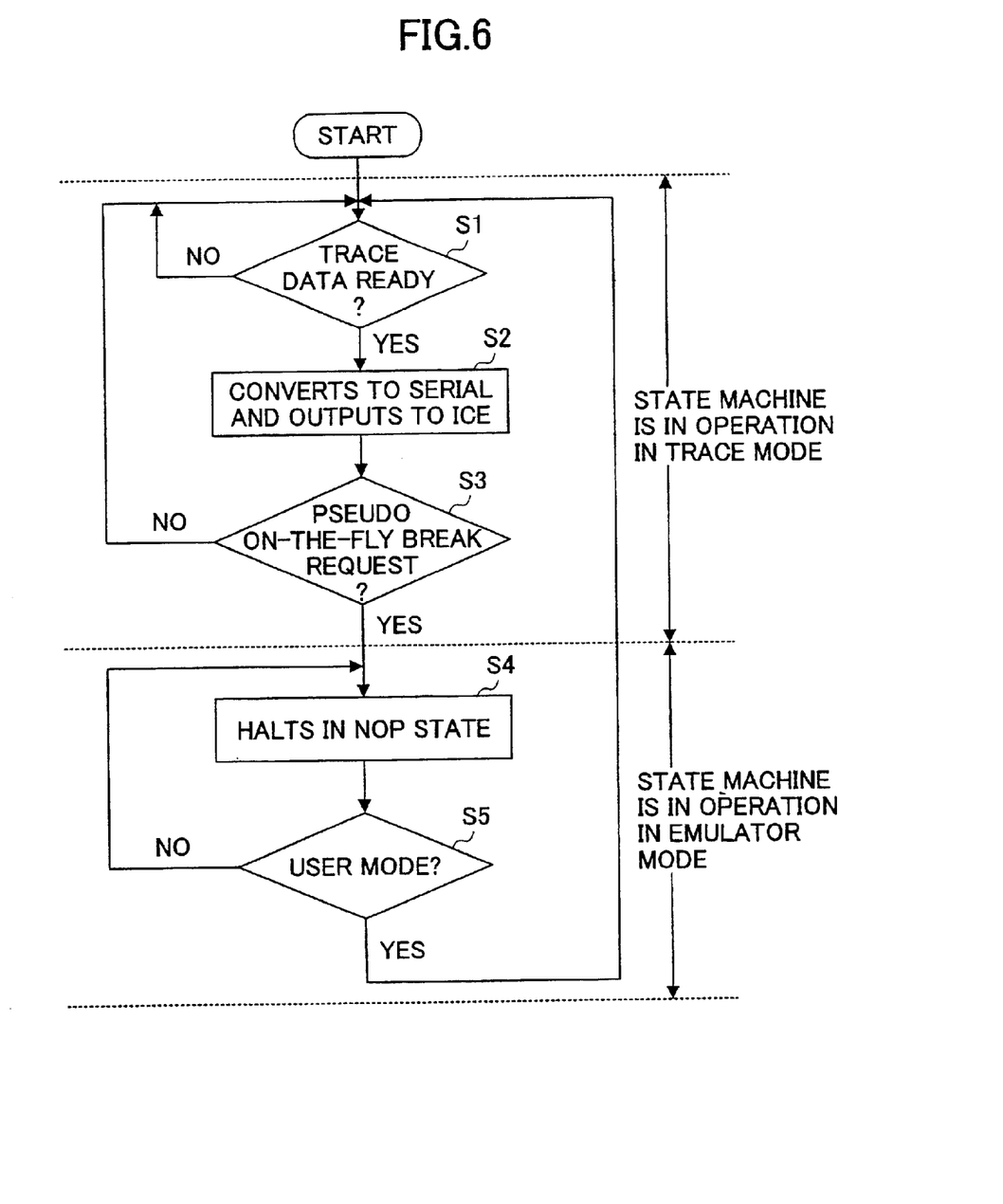
FIG. 6 shows a flow chart illustrating control operations of the state machine 34 for trace mode shown in FIG. 5.

FIG. 6 shows a flow chart illustrating control operations of the state machine 34 for trace mode shown in FIG. 5.

In FIG. 6, if a trace data is ready for outputting to the read control circuit 35 (S1), the state machine 34 for trace mode converts the trace data to serial according to a predetermined format and outputs it to the ICE 10 (S2). If no trace data exists, the state machine 34 waits until a trace data becomes ready. After outputting the trace data, the state machine 34 detects a break request. If it is determined that the detected break request is a pseudo on-the-fly break request (S3), the state machine 34 for trace mode stops or halts in an NOP state (S4). At this time, the CPU 2 receives the break request and moves from trace mode to emulator mode.

Next, if there is no more break request and it is confirmed that the CPU 2 has returned to user mode, the state machine 34 returns to trace mode again, and monitors whether a trace data is ready for outputting to the read control circuit 35. If the CPU2 has not returned to the user mode, the state machine keeps at a halt in the NOP state.

At step S3, if a break request is detected but it is determined that it is not a pseudo on-the-fly break request but a normal break request, the user program is suspended and no new trace data is generated. As time goes by, all the trace data in FIFO 12 are outputted to the ICE 10, and the state machine stops at S1. After step S5, when coming back from the on-the-fly break, the trace data is maintained in the previous state within the read control circuit 35, and therefore outputting the trace data is resumed according to step S1 determination.

Figure 7A:
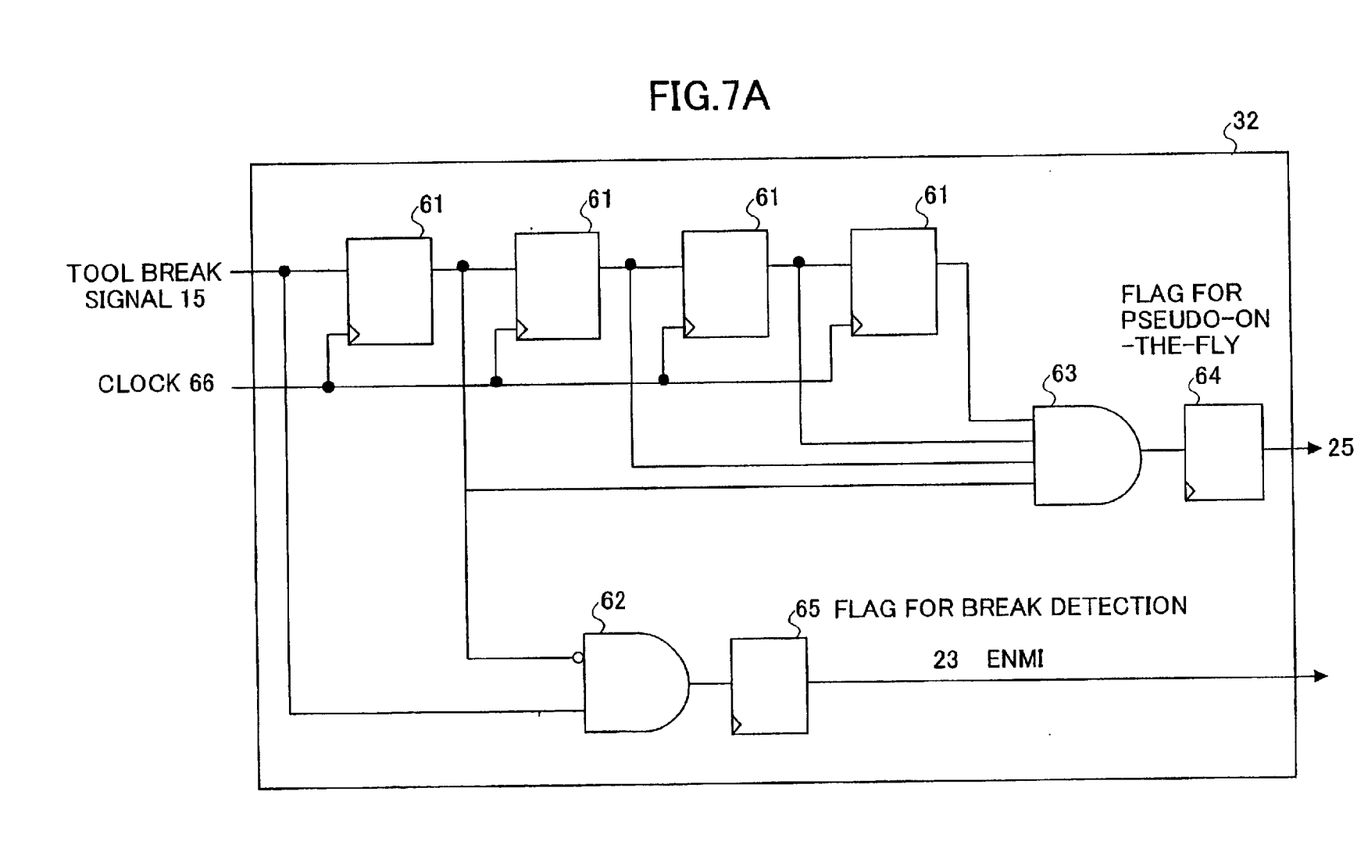
FIGS. 7A and 7B respectively shows a circuit diagram of the break detecting/determining circuit 32 shown in FIG. 5 and a timing chart.
Figure 7B:
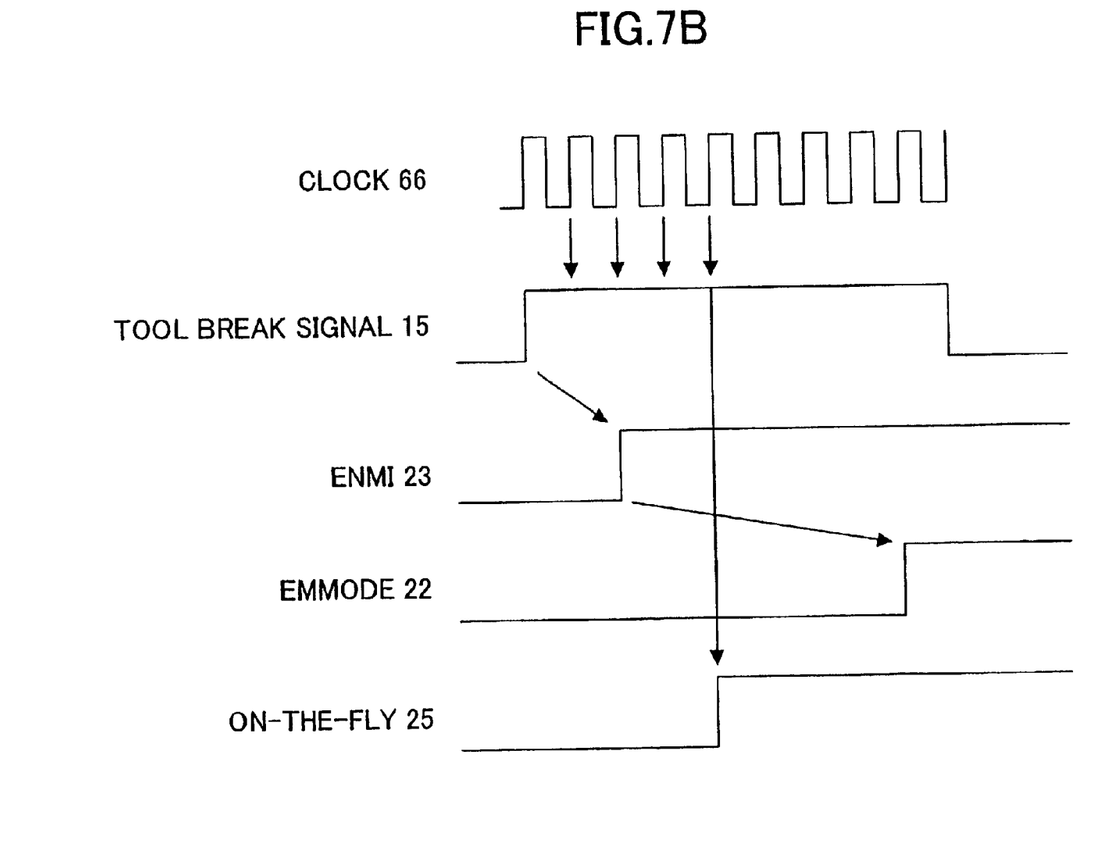

FIGS. 7A and 7B respectively shows a circuit diagram of the break detecting/determining circuit 32 shown in FIG. 5 and a timing chart.

In FIG. 7A, latches 61, two input AND gate 62 having one inverted input, four input AND gate 63, a break detecting flag 65 and a clock 66 supplied to latches 61.

A tool break signal 15 from the ICE 10 is supplied to the first latch 61 and the two input AND gate 62. At the timing of the clock 66, leading edge of the tool break signal 15 inputted asynchronously is detected, the output level of the AND gate 62 becomes high, and a break detecting flag is set. From this flag, a break detection signal 23 (ENMI in this embodiment) is generated. This break detection signal 23 is sent to the CPU 2 and DSU 5 irrespective of whether a normal break or a pseudo on-the fly break.

The CPU 2 receives the ENMI 23, suspends its processing, and asserts EMMODE 22 to notify the DSU 5 that the CPU 2 moves to the emulator mode (See FIGS. 3 and 5). In a timing chart shown in FIG. 7B, when the tool break signal 15 keeps high during four clocks, it is determined that a pseudo on-the-fly break exists. Accordingly, an on-the-fly signal becomes high synchronizing with the fourth clock. This sets the pseudo on-the-fly flag 64 at the next clock timing.

The DSU 5 does not output a trace data if the above break determining circuit determines that a pseudo on-the-fly flag is set. The DSU 5 outputs a trace data if it is determined that a pseudo on-the-fly flag is not set.

Figure 8:
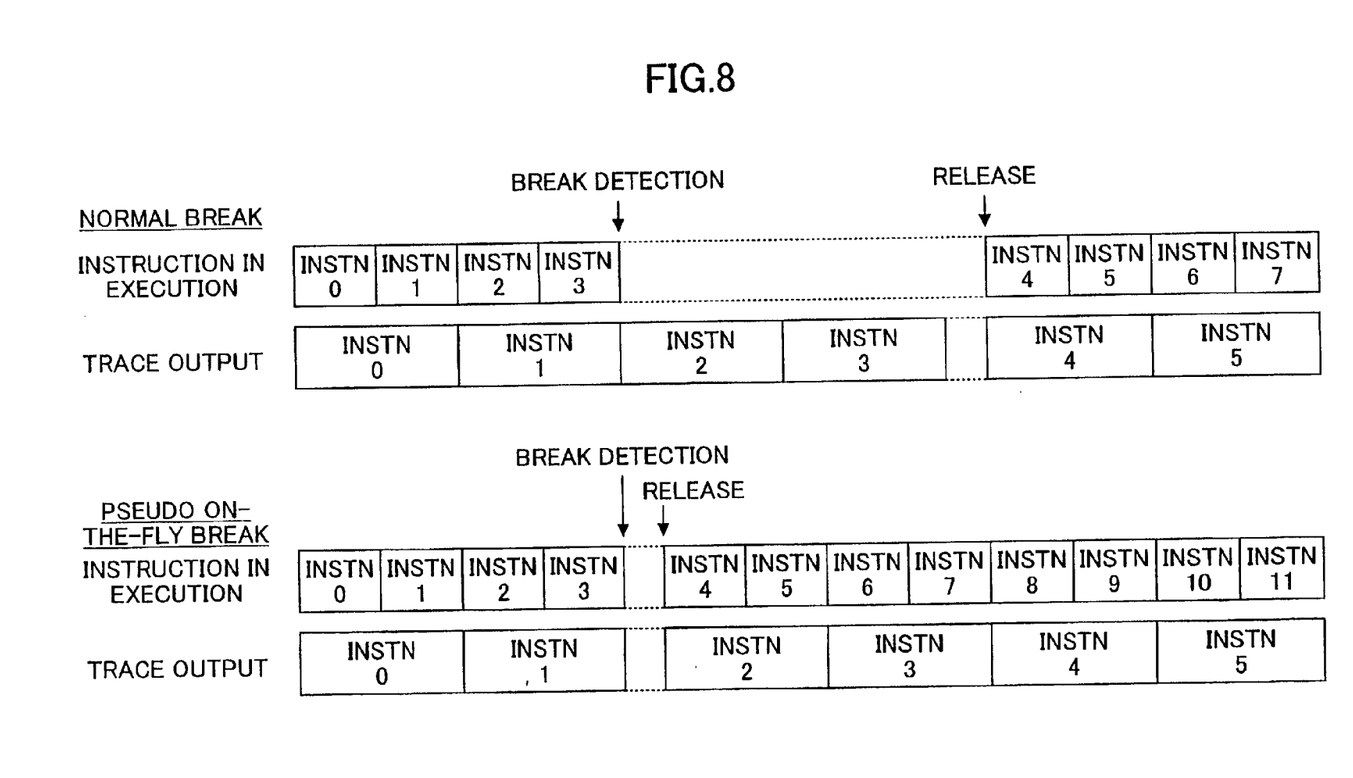
FIG. 8 shows the differences between normal break execution and pseudo on-the-fly break execution.

FIG. 8 shows the differences between normal break execution and pseudo on-the-fly break execution. In this figure, the CPU 2 detects a break signal at an instruction 3, stops after the instruction 3 and moves to an emulator mode. At this time, outputting the trace data of an instruction 1 only has been finished.

In a case of a normal break, the trace data of instructions 2 and 3 are continuously outputted. Therefore, debugging process will start after outputting the trace data of the instructions 2 and 3 is completed. In a case of a pseudo on-the-fly break, trace data outputting is stopped at once, and debugging process is started. Thereafter, the break is released, and the CPU returns to a trace mode and resumes the execution of user program from an instruction 4. In the normal break, the trace data outputting starts at the instruction 4. In the pseudo on-the-fly break, the trace outputting starts at the instruction 2.

The difference between these two cases will be explained below with using a concrete example. The following assumption is made for convenience of explanation. (1) There are 100 trace data in the trace buffer when the break happens. (2) The number of clocks necessary for outputting trace data is 10 clocks for instruction trace, and 14 clocks for data trace. (3) The ratio of the instruction trace to the data trace is 1 to 5. (4) The operating frequency of the bus 11 for outputting the trace data to ICE is 50 MHz.

Calculation based on the above assumption shows that 13 clocks are necessary for one trace data and 1300 clocks are necessary for 100 trace data. Accordingly, in a case of the pseudo on-the-fly break, bus mode can be switched to start debugging faster than the normal break by 1300×20 ns, that is by about 26 microseconds. In other words, the time duration that CPU suspends user program is shortened by about 26 microseconds. This time difference provides smaller difference between the system and the actual operation and provides more accurate emulation.

This time difference depends on how far the user program is executed at the break point and on how many trace data exist in the FIFO. Therefore, the time difference becomes larger especially when the break happens after long instructions have been executed continuously.

According to the above embodiment having a break detecting circuit for detecting a pseudo on-the-fly break to execute break at the timing between two trace data outputted from a FIFO, the time duration of suspending user program can be significantly shortened in a case where trace data is not needed.

According to the above embodiment, because the outputting of trace data remaining in the FIFO is resumed at the place the break happened, the continuity of the trace data is assured.

Further, according to the above embodiment, because a circuit for detecting the transition of a tool break indication signal and a circuit for detecting the level of the tool break indication signal are provided to determine whether the break is a normal break or a pseudo on-the-fly break, the function explained above can be carried out without adding any other dedicated signal line.

The present invention is not limited to the embodiment, but various variations and modifications may be made without departing from the scope of the present invention.

This patent application is based on Japanese priority patent application No. 2001-108954 filed on Apr. 6, 2001, the entire contents of which are hereby incorporated by reference.

What is claimed is:

1. A semiconductor integrated circuit including a debugging support unit and a buffer memory for temporarily storing trace data, the debugging support unit comprising:

a break detection circuit that detects a break signal externally inputted; and a break determining circuit that determines whether the break signal requests to shift to break processing after outputting all the trace data stored in the buffer memory or the break signal requests to shift to the break processing with immediately suspending trace data outputting.

2. The semiconductor integrated circuit according to claim 1, wherein the debugging support unit comprises:

a read control circuit that reads the trace data from the buffer memory and generates a notice signal notifying that preparation is made for outputting the trace data; and a state machine that externally outputs the trace data in response to the notice signal from the read control circuit, and immediately suspends the outputting of the trace data when the break determining circuit determines that the break signal requests to immediately shift to the break processing.

3. The semiconductor integrated circuit according to claim 1, wherein tho debugging support unit comprising:

a read control circuit that reads the trace data from the break determining circuit comprises a circuit for sensing a level of the break signal.

4. The semiconductor integrated circuit according to claim 1, wherein when the outputting of the trace data was suspended to shift to the break processing and the processing returns to a trace mode, the trace data left in the buffer memory is outputted externally after the return.

* * * * *

UNITED STATES PATENT AND TRADEMARK OFFICE
CERTIFICATE OF CORRECTION

| | |
|---|---|
| PATENT NO. | : 6,877,113 B2 |
| APPLICATION NO. | : 10/101777 |
| DATED | : April 5, 2005 |
| INVENTOR(S) | : Toshiaki Saruwatari et al. |

It is certified that error appears in the above-identified patent and that said Letters Patent is hereby corrected as shown below:

Column 6, line 65, change "tho" to -- the --

Column 6, line 65, change "comprising" to --comprises --

Signed and Sealed this

Twenty-second Day of May, 2007

JON W. DUDAS
*Director of the United States Patent and Trademark Office*